United States Patent
Nam et al.

(10) Patent No.: US 11,195,496 B2
(45) Date of Patent: Dec. 7, 2021

(54) ELECTRONIC DEVICE FOR IMPROVING GRAPHIC PERFORMANCE OF APPLICATION PROGRAM AND OPERATING METHOD THEREOF

(71) Applicant: Samsung Electronics Co., Ltd., Gyeonggi-do (KR)

(72) Inventors: Jung Nam, Gyeonggi-do (KR); Eunji Kim, Gyeonggi-do (KR); Sangik Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/922,071

(22) Filed: Jul. 7, 2020

(65) Prior Publication Data
US 2021/0056932 A1 Feb. 25, 2021

(30) Foreign Application Priority Data

Aug. 20, 2019 (KR) .................. 10-2019-0101947
Dec. 26, 2019 (KR) .................. 10-2019-0175559

(51) Int. Cl.
*G09G 5/36* (2006.01)

(52) U.S. Cl.
CPC .................... *G09G 5/36* (2013.01)

(58) Field of Classification Search
CPC ........... G09G 5/36; G06T 5/00; G06T 7/0014; G06T 7/11; G06T 7/174; G06T 2207/30168; G06T 5/001; G06T 5/50; G06T 2207/10016; G06T 7/0002; H04N 19/176; H04N 19/167; H04N 5/23229
See application file for complete search history.

(56) References Cited

U.S. PATENT DOCUMENTS

| | | | |
|---|---|---|---|
| 7,180,548 B2 | 2/2007 | Mishima et al. | |
| 8,619,198 B1 * | 12/2013 | Andreev | G11B 27/28 |
| | | | 348/701 |
| 9,300,906 B2 * | 3/2016 | Kokaram | H04N 19/597 |
| 2015/0084986 A1 | 3/2015 | Lee et al. | |
| 2015/0130823 A1 | 5/2015 | Kim et al. | |
| 2017/0031430 A1 | 2/2017 | Ansorregui et al. | |
| 2018/0115785 A1 | 4/2018 | Lee | |
| 2019/0279028 A1 * | 9/2019 | Wang | G06N 3/08 |

FOREIGN PATENT DOCUMENTS

| | | |
|---|---|---|
| EP | 3 125 072 B1 | 9/2018 |
| GB | 2578629 A | 5/2020 |
| JP | 2009-093442 A | 4/2009 |
| KR | 10-2017-0015097 A | 2/2017 |

OTHER PUBLICATIONS

International Search Report dated Aug. 26, 2020.

* cited by examiner

Primary Examiner — Xilin Guo
(74) Attorney, Agent, or Firm — Cha & Reiter. LLC

(57) ABSTRACT

An electronic device and method are disclosed herein. The electronic device includes a display and processor. The processor implements the method including executing an application, and based on detecting a frame drop, identifying an insertion position of an interpolation image for a plurality of images generated by execution of the application. An interpolation image is generated based on the identified insertion position and the interpolation image is inserted into the plurality of images at the identified insertion position.

15 Claims, 16 Drawing Sheets

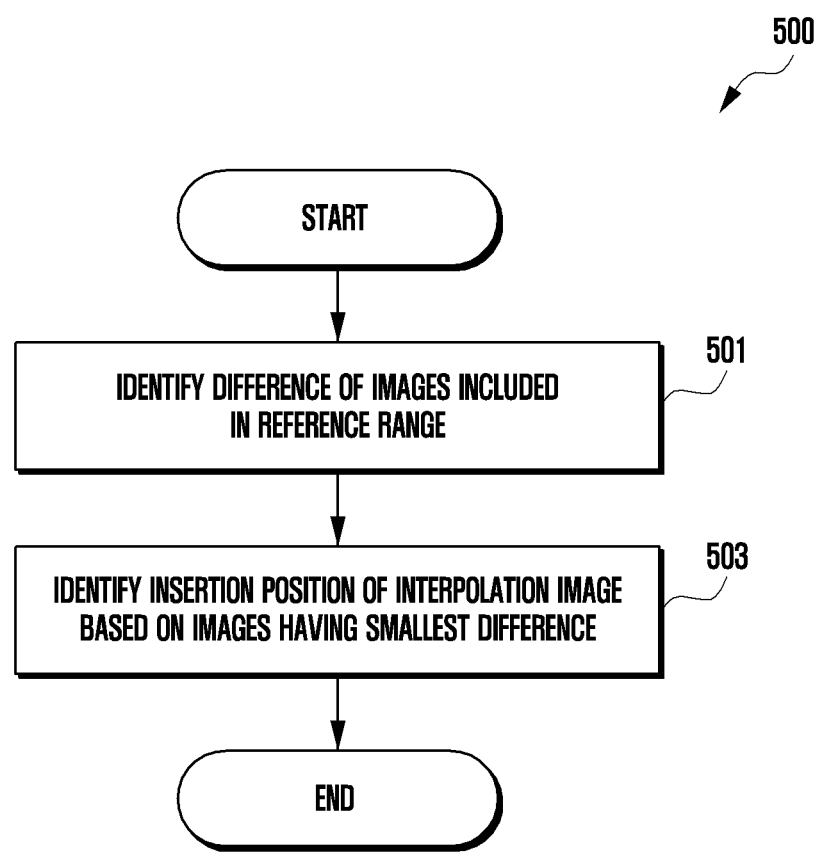

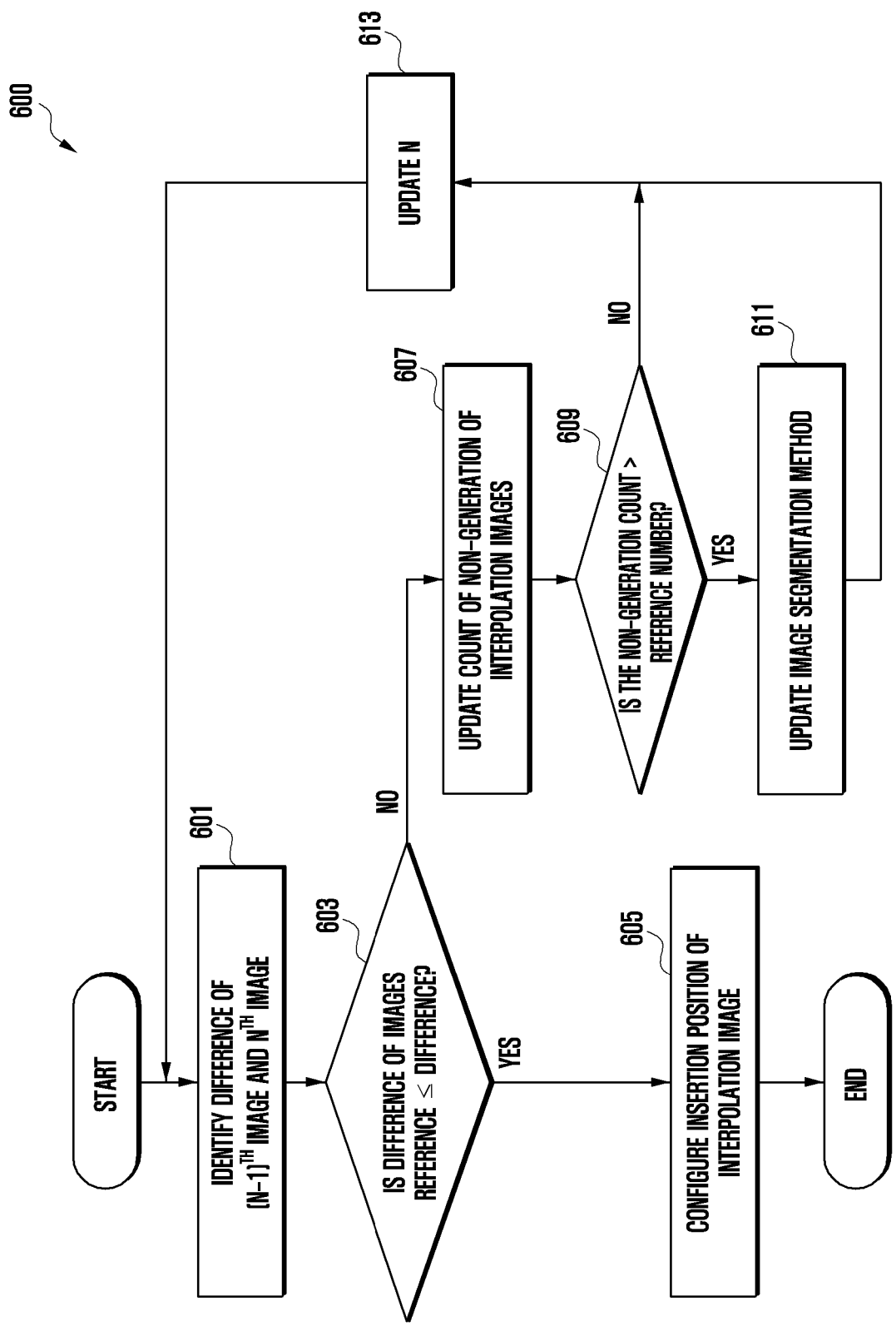

FIG. 7A
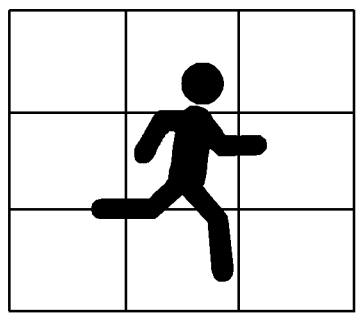  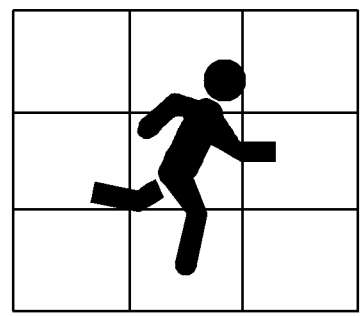
(N-1)$^{TH}$ IMAGE (700)　　　　　　　N$^{TH}$ IMAGE (702)

FIG. 7B
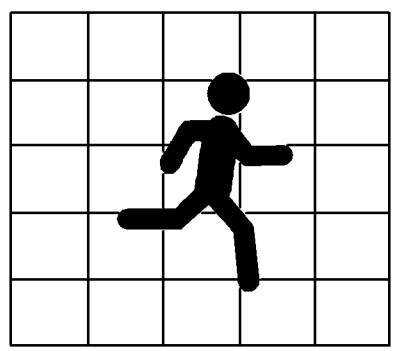 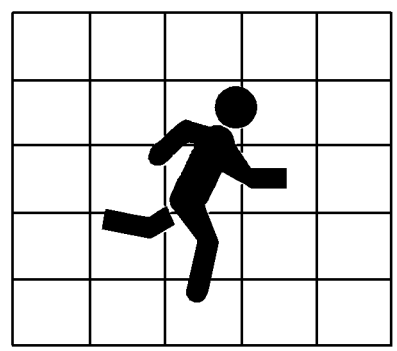
(N-1)^TH IMAGE (710)    N^TH IMAGE (712)

ELECTRONIC DEVICE FOR IMPROVING GRAPHIC PERFORMANCE OF APPLICATION PROGRAM AND OPERATING METHOD THEREOF

CROSS-REFERENCE TO RELATED APPLICATION(S)

This application is based on and claims priority under 35 U.S.C. 119 to Korean Patent Application Nos. 10-2019-0101947 & 10-2019-0175559, filed on Aug. 20, 2019 & Dec. 26, 2019, in the Korean Intellectual Property Office, the disclosure of which is herein incorporated by reference in their entireties.

BACKGROUND

1) Field

The disclosure relates to an electronic device for improving a graphic performance of an application program in an electronic device and an operating method thereof.

2) Description of Related Art

With the development of information communication technology and semiconductor technology, various electronic devices are improving as multimedia devices that are capable of providing various multimedia services. The multimedia service may include at least one of a voice call service, a messaging service, a broadcast service, a wireless Internet service, a camera service, an electronic payment service, and/or a music playback service.

The electronic device may provide various services utilized by the user by way of application programs. The application programs may include for example music applications, games, a call application program, and a camera application program, etc.

The above information is presented as background information only to assist with an understanding of the disclosure. No determination has been made, and no assertion is made, as to whether any of the above might be applicable as prior art with regard to the disclosure.

SUMMARY

The electronic device may support a frame interpolation (FI) method to improve graphic performance (e.g., frames per second or "FPS") of an application program. For example, in the frame interpolation method, an interpolated image is generated by mixing the $(n-1)^{th}$ image (or frame) and the $n^{th}$ image (or frame), and inserting and rendering the interpolated image between the images (e.g., the $(n-1)^{th}$ image and the $n^{th}$ image) to double the FPS of the application program.

However, the frame interpolation method may generate higher graphic performance than necessary when adding the interpolated image between images (or frames) associated with an application program. For example, the frame interpolation method can improve the graphic performance of an application program supporting 40 FPS to 80 FPS. However when the electronic device supports a maximum of 60 FPS, computing resources are wasted in generation 80 FPS, which produces a waste of 20 unnecessary images (or frames).

In addition, when the frame interpolation method is applied to the electronic device, an afterimage may occur in the interpolated image due to the difference between the images referred to generate the interpolated image.

Certain embodiments disclose a device and a method for optimizing the graphic performance of an application program in an electronic device.

Certain embodiments disclose a device and method for reducing the occurrence of an afterimage caused by application of a frame interpolation method in an electronic device.

According to certain embodiments, an electronic device may include a display device, and a processor operatively connected to the display device, wherein the processor is configured to: execute an application program, based on detecting a frame drop, identify an insertion position of an interpolation image for a plurality of images related to execution of the application program, generate an interpolation image corresponding to the identified insertion position of the interpolation image, and insert the interpolation image into at least a portion of the plurality of images according to the identified insertion position.

According to certain embodiments, an operation method of an electronic device may include: executing an application program, based on detecting a frame drop, identifying an insertion position of an interpolation image based on a plurality of images related to execution of the application program, generating an interpolation image corresponding to the identified insertion position of the interpolation image, and inserting the interpolation image into at least a portion of the plurality of images according to the identified insertion position.

According to various embodiment, an electronic device may include a display device, and a processor operatively connected to the display device, wherein the processor is configured to execute an application program, identify a difference between images having adjacent playback time points among a plurality of images related to execution of the application program, identify an insertion position of an interpolation image based on the identified difference between the images, generate an interpolation image corresponding to the identified insertion position of the interpolation image, and insert the interpolation image into at least a portion of the plurality of images based on the identified insertion position.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 5 is a flowchart illustrating configuration of an insertion position of an interpolation image on the basis of a reference range in an electronic device according to certain embodiments;

FIG. 6 is a flowchart illustrating configuration of an insertion position of an interpolation image on the basis of differences in images in an electronic device according to certain embodiments;

FIG. 7A illustrates a configuration of an image segmentation method according to certain embodiments, and FIG. 7B illustrates a configuration of an image segmentation method according to certain embodiments;

DETAILED DESCRIPTION

Figure 1:
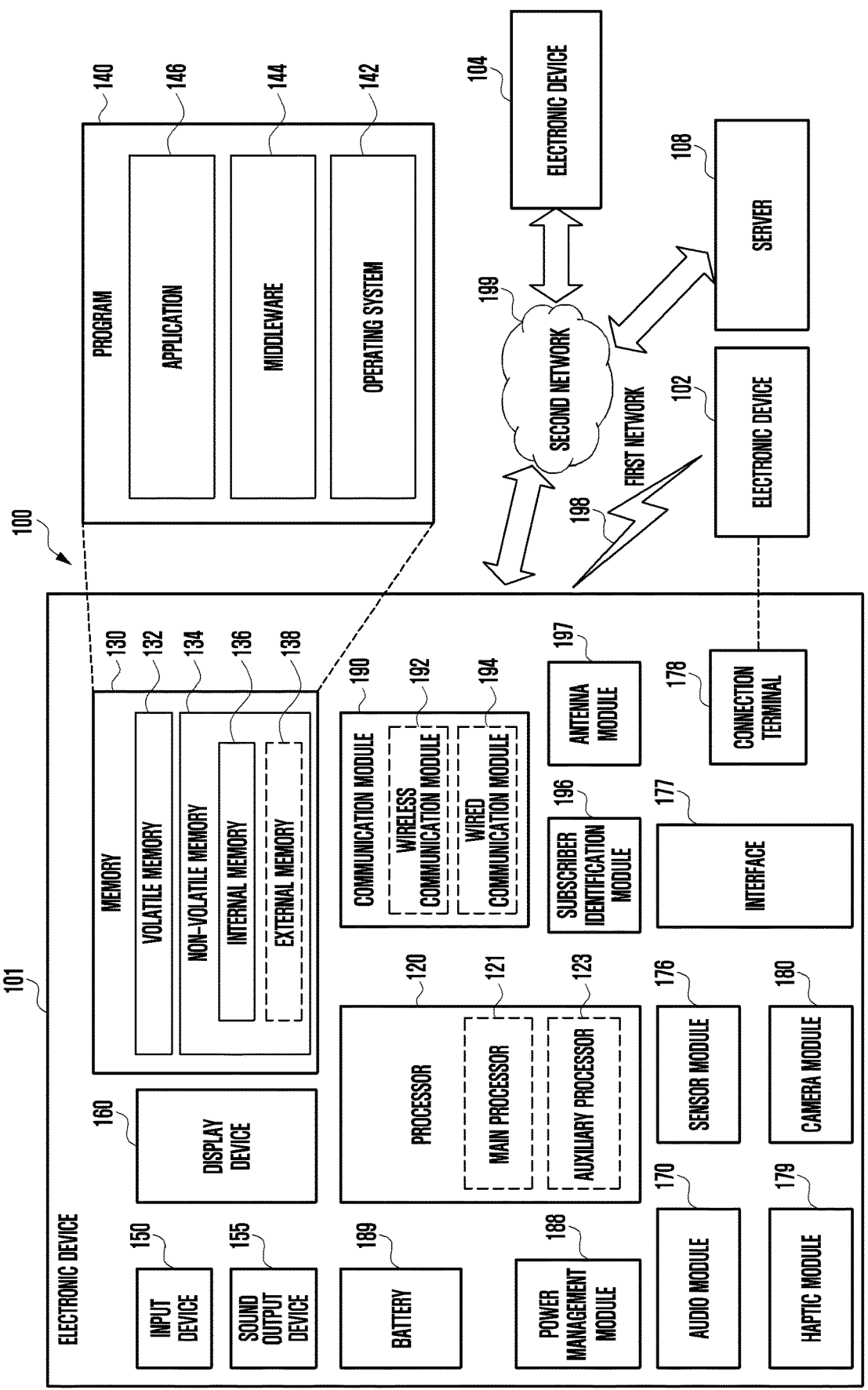
FIG. 1 is a block diagram of an electronic device in a network environment, according to certain embodiments.

Hereinafter, certain embodiments will be described in detail with reference to the accompanying drawings. It should be understood that the examples and terms used herein are not intended to limit the technology described in this document to specific embodiments, but include various modifications, equivalents, and/or substitutes of the examples. In connection with the description of the drawings, similar reference numerals may be used for similar components. Singular expressions may include plural expressions unless the context clearly indicates otherwise.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
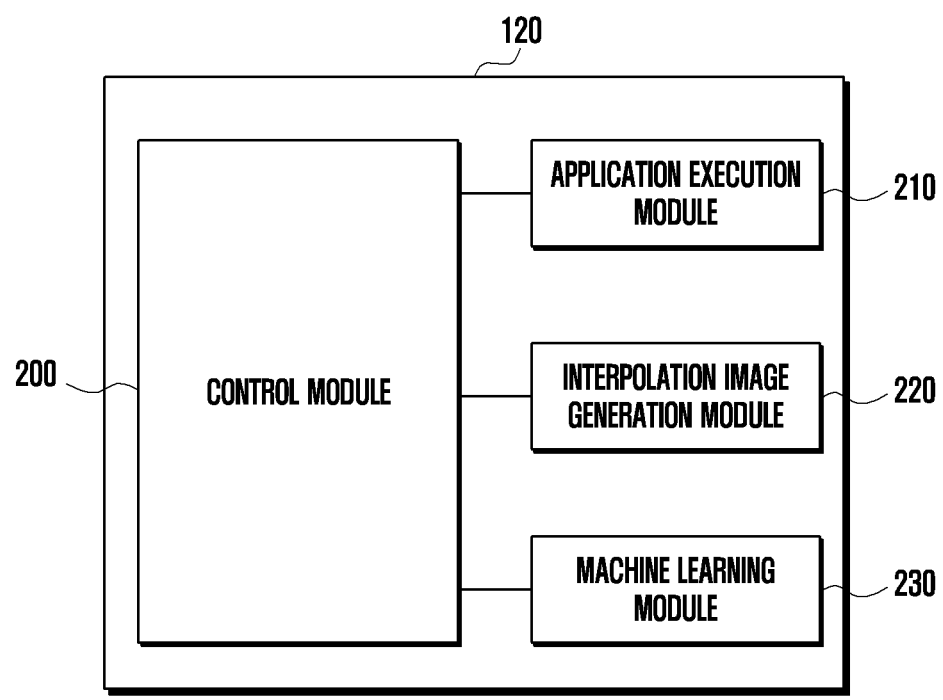
FIG. 2 is a block diagram of an electronic device for selectively inserting an interpolation image according to certain embodiments.
Figure 3A:
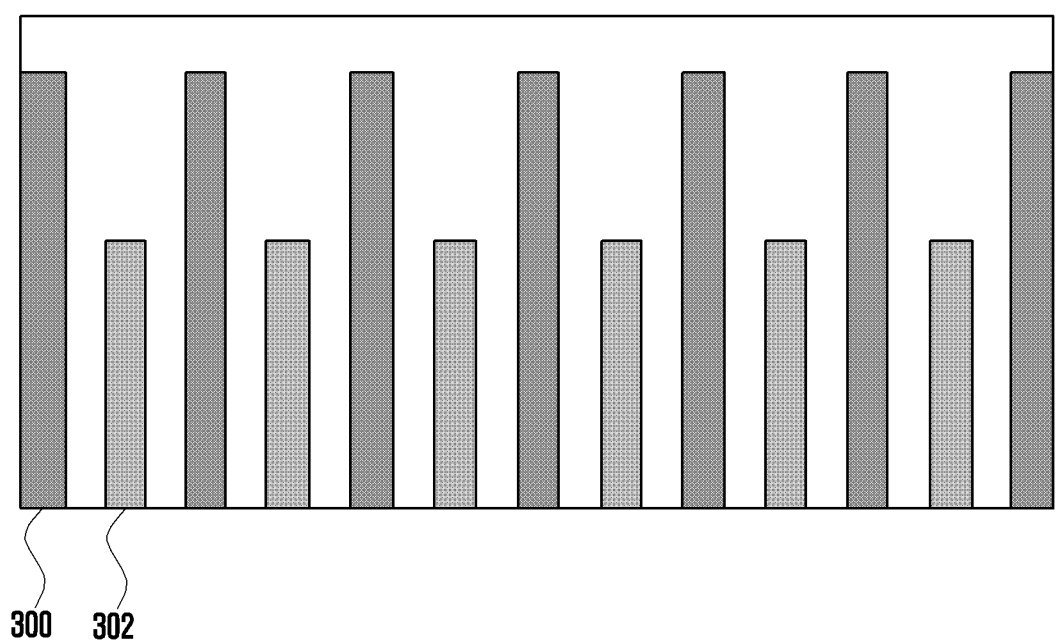
FIG. 3A illustrates a configuration in which interpolation images according to certain embodiments are inserted.
Figure 3B:
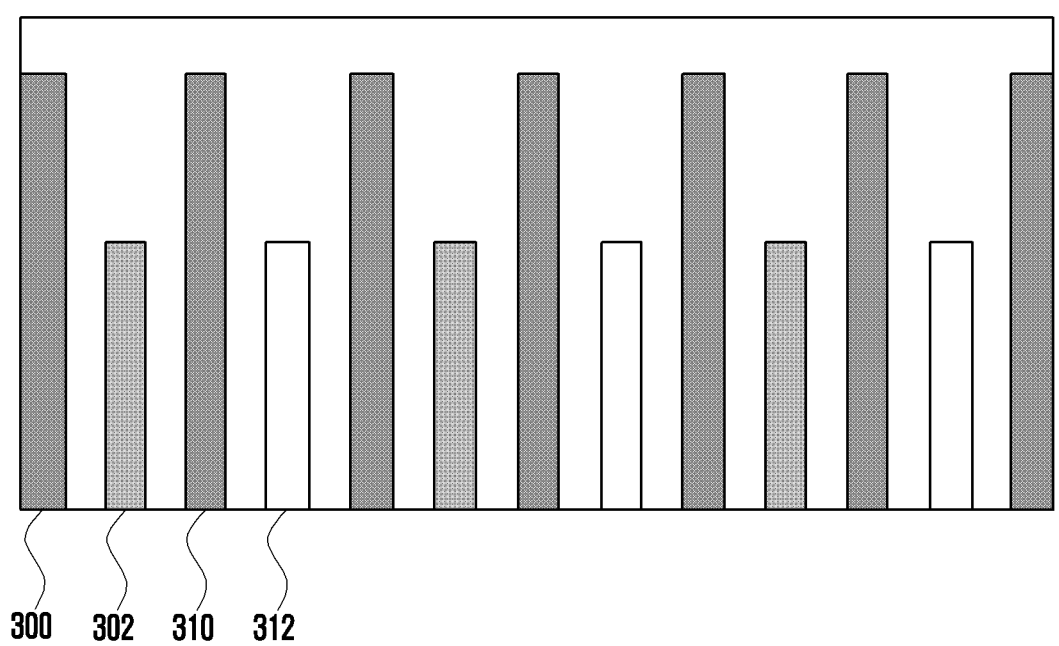
FIG. 3B illustrates a configuration in which interpolation images according to certain embodiments are inserted.
Figure 3C:
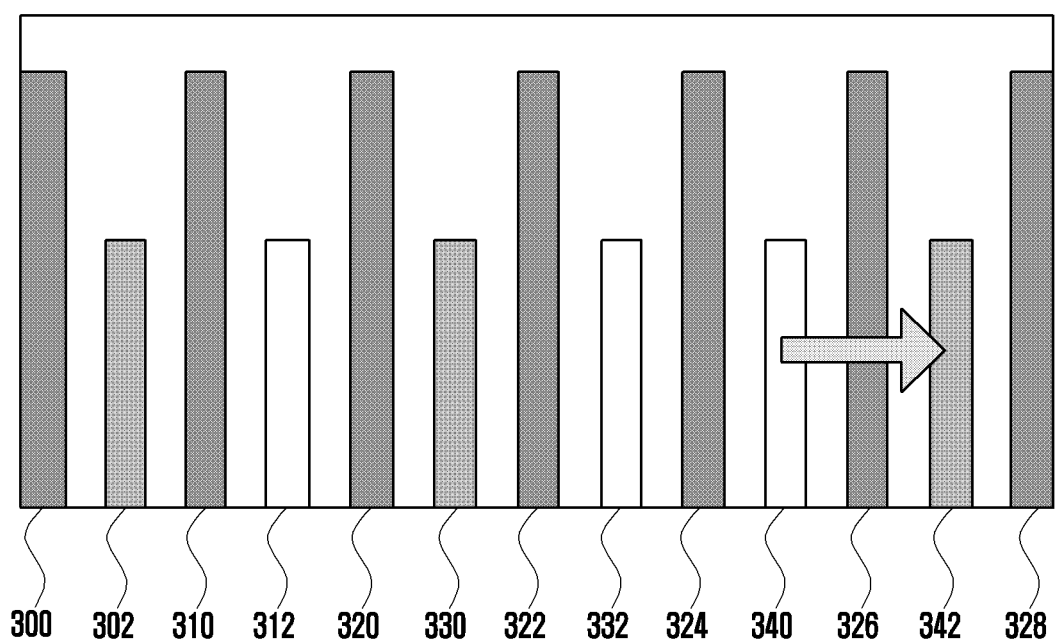
FIG. 3C illustrates a configuration in which interpolation images according to certain embodiments are inserted.

FIG. 2 is a block diagram of an electronic device 101 for selectively inserting an interpolation image according to certain embodiments. As an example, at least some components of FIG. 2 will be described with reference to FIGS. 3A, 3B, and 3C. FIG. 3A illustrates a configuration in which interpolation images according to certain embodiments are inserted, FIG. 3B illustrates a configuration in which interpolation images according to certain embodiments are inserted, and FIG. 3C illustrates a configuration in which interpolation images according to certain embodiments are inserted.

Referring to FIG. 2, according certain embodiments, a processor 120 may include a control module 200, an application execution module 210, an interpolation image generation module 220, and/or a machine learning module 230. For example, the modules 200, 210, 220, and 230 included in the processor 120 may be implemented using software, so that instructions related to the processor 120 may be located and executed from a memory (e.g., the memory 130 of FIG. 1).

According to certain embodiments, the control module 200 may control the execution of an application program. According to an embodiment, the control module 200 may control the application execution module 210 to execute an application program (e.g., a game) corresponding to an icon selected by a user input among a plurality of icons displayed on the display device 160. According to an embodiment, the control module 200 may control the interpolation image generation module 220 to generate an interpolation image to improve graphic performance (e.g., frames per second (FPS)) of the application program executed via the application execution module 210. For example, the control module 200 may configure the insertion position of the interpolation image based on the target graphic performance (e.g., FPS) of the application program executed in the application execution module 210 (e.g., positioning an insertion frame at regular intervals—referred to herein as reference ranges—in order to boost FPS from a 30 FPS to 45 FPS, which would require inserting 1 interpolation frame for every 2 existing frames). For another example, the control module 200 may configure the insertion position of the interpolation image for each reference range based on the difference (or difference value) of adjacent images (or frames) related to the execution of the application program. For example, the control module 200 may configure the insertion position of an interpolation image within a reference range based on two images (or frames) having the smallest difference between adjacent images (or frames) within the reference range. A reference range may indicate a number of frames in which one interpolation image is to be inserted. As an example, the size of the reference range may be configured based on at least one of target graphic performance (e.g., FPS) of the application program or status information of the electronic device 101. As another example, the control module 200 may configure the insertion position of the interpolation image on the basis of two images (or frames) in which a difference between images (or frames) satisfies a reference difference among a plurality of images (or frames) related to execution of an application program. For example, the control module 200 may configure an insertion position of the interpolation image on the basis of a Q-learning result on the basis of a difference between images performed through the machine learning module 230.

According to certain embodiments, the control module 200 may identify differences between adjacent frames/images among the plurality of images (or frames) related to the execution of the application program executed in the application execution module 210. According to an embodiment, the control module 200 may configure an image segmentation method on the basis of target graphic performance (e.g., FPS) of the application program executed in the application execution module 210. The control module 200 may compare the images by dividing each image into parts (e.g., cells) using image segmentation, and then compare corresponding cells between the two images (e.g., being disposed in a same part of the image) to detect differences between the images. For example, the control module 200 may configure the granularity of an image segmentation method by selection of a number of parts or segments (e.g., 10×10 segmentation has less detail than 20×20 segmentation) so that images can be compared with more detail when the target program's target graphic performance is relatively below a certain threshold (e.g., 30 FPS or less). According to an embodiment, the control module 200 may change an image segmentation method for identifying a difference between images on the basis of the number of times the difference between the images does not satisfy the reference difference. For example, the control module 200 may change the image segmentation method so that images can be relatively closely compared when the number of times that the difference between the images does not satisfy the reference difference exceeds the reference number. For example, the difference between the images is a change amount of at least one object included in the image, and it can be determined that the difference between the images is relatively large as the change amount of the object is relatively large.

According to certain embodiments, when the occurrence of frame reduction is detected or predicted, the control module 200 may control the graphic performance of the application program generated by the application execution module 210 to be improved. According to an embodiment, when the occurrence of frame reduction is detected or predicted, the control module 200 may control the interpolation image generation module 220 to apply a frame interpolation (FI). For example, the control module 200 may control the interpolation image generation module 220 to selectively generate an interpolation image on the basis of at least one of target graphic performance or image differences of the application program generated by the application execution module 210. According to an embodiment, when the occurrence of frame reduction is detected or predicted, the control module 200 may identify the Q-learning result on the basis of the difference between the images performed through the machine learning module 230. When it is determined that the application of the frame interpolation method is appropriate on the basis of the Q-learning result, the control module 200 may control the interpolation image generation module 220 to selectively interpolate based on at least one of target graphic performance or differences images (or frames) of the application program generated by the application execution module 210. When it is determined that the application of the clock control method is appropriate on the basis of the Q-learning result, the control module 200 may control the clock of the internal circuit (e.g., CPU or GPU) related to the graphic of the application program. For example, frame reduction may include a phenomenon in which the generation of a frame (or image) related to execution of an application program for rendering is limited or lost at a time point based on a state of the electronic device 101.

According to certain embodiments, the control module 200 may render an image (or frame) generated by at least one of the application execution module 210 or the interpolation image generation module 220 so that the image (or frame) can be displayed on the display device 160. According to an embodiment, the control module 200 may insert and render the interpolation image generated by the interpolation image generation module 220 into a plurality of images (or frames) related to execution of the application program generated by the application execution module 210. For example, the control module 200 may insert and render an interpolation image 302 for each image (or frame) 300 related to the execution of the application program generated by the application execution module 210, as shown in FIG. 3A. By inserting one interpolation image for each existing frame, the graphic performance (FPS) may be mathematically doubled from, for example, 30 FPS to 60 FPS, which improves upon the native 30 FPS performance originally supported by the application program, as shown in FIG. 3A. For another example, the control module 200 may insert and render the interpolation image 302 for every two images (or frames) on the basis of the target graphic performance (e.g., 30 FPS to be increased to 45 FPS) of the application program, as shown in FIG. 3B. For example, the control module 200 may insert and render the interpolation image 302 after the first frame 300 related to the execution of the application program, but contrary to the previous example, neglect insertion of another interpolation image in position 312. This results in an insertion of 1 interpolation image for every 2 existing frames, resulting in an approximate 33% increase in frame rate (e.g., 30 FPS to 45 FPS). In another example, the control module 200 may selectively insert and render an interpolation image on the basis of a difference between images (or frames) related to the execution of an application program generated by the application execution module 210, as shown in FIG. 3C. For example, if the difference between the fifth image (or frame) 324 and the sixth image (frame) 326 is greater than or equal to a reference difference (e.g., 50%), the control module 200 may limit the insertion of the interpolation image between the fifth image (or frame) 324 and the sixth image (or frame) 326 (340). If the difference between the sixth image (or frame) 326 and the seventh image (or frame) 328 is less than the reference difference (e.g., 50%), the control module 200 may insert and render an interpolation image 342 between the sixth image (or frame) 326 and the seventh image (or frame) 328. The sum of this methodology is that positions 312, 332 and 340 result in an absence of an interpolation image for frame pairs having sufficient differences equal or greater than the threshold, whereas interpolation images 302, 330 and 342 are generated for frames having insufficient differences less than the threshold.

According to certain embodiments, the application execution module 210 may execute an application program. According to an embodiment, the application execution module 210 may generate a plurality of images (or frames) related to the execution of the application program. For example, when executing a game application, the application execution module 210 may generate a plurality of images (or frames) corresponding to the progress of the game.

According to certain embodiments, the interpolation image generation module 220 may generate at least one interpolation image for improving the graphic performance of the application program executed in the application execution module 210 on the basis of the control of the control module 200. According to an embodiment, if an application program is executed in the application execution module 210, the interpolation image generation module 220 may generate the interpolation image corresponding to an insertion position configured by the control module 200. For example, the interpolation image may be generated by referring to two adjacent (or contiguous) images (or frames) of a plurality of images (or frames) related to the execution of an application program to be inserted between two adjacent (or contiguous) images (or frames). For example, the reference ratio of two adjacent images for generating an interpolation image may be fixed (e.g., 0.5), or may be varied based on an insertion position of an interpolation image or an image difference of a reference image. According to an embodiment, when the occurrence of frame reduction associated with the application program executed in the application execution module 210 is detected or predicted, the interpolation image generation module 220 may generate an interpolation image corresponding to the insertion position configured by the control unit 200.

According to certain embodiments, the machine learning module 230 may perform machine learning on the basis of at least one of status information of the electronic device 101 or images (or frames) provided in an application program. According to an embodiment, the machine learning module 230 may determine optimal graphic performance (e.g., FPS) of an application program executed in the application execution module 210 through machine learning. According to an embodiment, when the application program is executed by the application execution module 210, the machine learning module 230 may predict a frame drop associated with the application program through machine learning. According to an embodiment, the machine learning module 230 may configure (or recommend) an optimal method among at least one method for solving frame reduction through learning. As an example, a method for solving the frame reduction may include at least one of a CPU clock control scheme, a GPU clock control scheme, or a frame interpolation scheme. In an example, machine learning may include Q-learning. For example, the status information of the electronic device 101 may include at least one of a clock of an internal element (e.g., GPU and/or CPU), a load of the internal element, and a power value of the electronic device 101 (e.g., remaining battery capacity), or temperature changes (internal and/or external) of the electronic device 101.

According to certain embodiments, the control module 200 may adjust a ratio between an image (or frame) related to the execution of the application program generated by the application execution module 210 and an interpolation image generated by the interpolation image generation module 220. According to an embodiment, the control module 200 may control the application execution module 210 and/or the interpolation image generation module 220 in order to replace at least some of the multiple images (or frames) related to the execution of the application program to be generated by the application execution module 210 with the interpolation image generated by the interpolation image generation module 220. For example, if the control module 200 executes a game application program that supports a first graphic performance (e.g., 60 FPS), the control module 200 may control the application execution module 210 to generate a plurality of images (or frames) related to the game application program on the basis of a second graphic performance (e.g., 50 FPS) lower than the first graphic performance. The control module 200 may control the interpolation image generation module 220 to generate at least one interpolation image corresponding to a difference (e.g., 10 FPS) between the first graphic performance (e.g., 60 FPS) and the second graphic performance (e.g., 50 FPS) so that the game application program is executed with the first graphic performance. For example, the interpolation image generation module 220 may generate at least one interpolation image with reference to the rendered images in connection with the execution of the game application program. In this case, the electronic device 101 may use at least one interpolation image corresponding to the difference (e.g., 10 FFS) between the first graphic performance (e.g., 60 FPS) and the second graphic performance (e.g., 50 FPS), so that it is possible to reduce resource consumption for the execution of the game application program rather than rendering the entire image (or frame) related to the execution of the game application program.

According to certain embodiments, an electronic device (e.g., the electronic device 101 of FIG. 1) may include a display device (e.g., the display device 160 of FIG. 1) and a processor (e.g., the processor 120 of FIG. 1) operatively connected to the display device, and the processor may execute an application program, and when a frame drop is detected, identify an insertion position of an interpolation image on the basis of a plurality of images related to execution of the application program, generate an interpolation image corresponding to the insertion position of the interpolation image, and insert the interpolation image into at least a part of the plurality of images on the basis of the insertion position of the interpolation image.

According to certain embodiments, the processor may identify a difference between adjacent images having a playback time point among the plurality of images, and identify an interpolation image insertion position on the basis of the difference between the images.

According to certain embodiments, the processor may identify the insertion position of the interpolation image within the reference range on the basis of a difference of images for each reference range.

According to certain embodiments, the processor may configure the insertion position of the interpolation image on the basis of images having the smallest difference in images within the reference range.

According to certain embodiments, the processor may identify a difference between a first image and a second image adjacent to a playback time point among a plurality of images related to the execution of the application program, and may configure an insertion position of the interpolation image on the basis of the first image and the second image when the difference between the first image and the second image satisfies a designated first condition.

According to certain embodiments, when configuring an insertion position of the interpolation image on the basis of the first image and the second image, the processor may generate an interpolation image between the first image and the second image through frame interpolation on the basis of the first image and the second image.

According to certain embodiments, when the difference between the first image and the second image does not satisfy the designate first condition, the processor may identify the difference between the second image and a third image, which are adjacent to each other in a playback time point among the plurality of frames.

According to certain embodiments, the processor may divide the first image and the second image into a first number of regions on the basis of a first segmentation method to identify differences in images, may identify the number of consecutive failures of the designated first condition when the difference between the first image and the second image does not satisfy the designated first condition, and may identify the difference between the images by dividing the second image and the third image into a second number of regions on the basis of a second segmentation method different from the first segmentation method when the number of consecutive failures of the designated first condition satisfies the designated second condition.

According to certain embodiments, the processor may identify the insertion position of the interpolation image on the basis of the Q-learning result based on the difference between images having adjacent playback time points among the plurality of images related to the execution of the application program.

According to certain embodiments, an electronic device (e.g., the electronic device 101 of FIG. 1) may include a display device (e.g., the display device 160 of FIG. 1) and a processor (e.g., the processor 120 of FIG. 1) operatively connected to the display device, and the processor may execute an application program, identify the difference between images adjacent to each other in a playback time point among the plurality of images related to the execution of the application program, identify an insertion position of an interpolation image on the basis of the difference of the images, generate an interpolation image corresponding to the insertion position of the interpolation image, and insert the interpolation image into at least a part of the plurality of images on the basis of the insertion position of the interpolation image.

Figure 4:
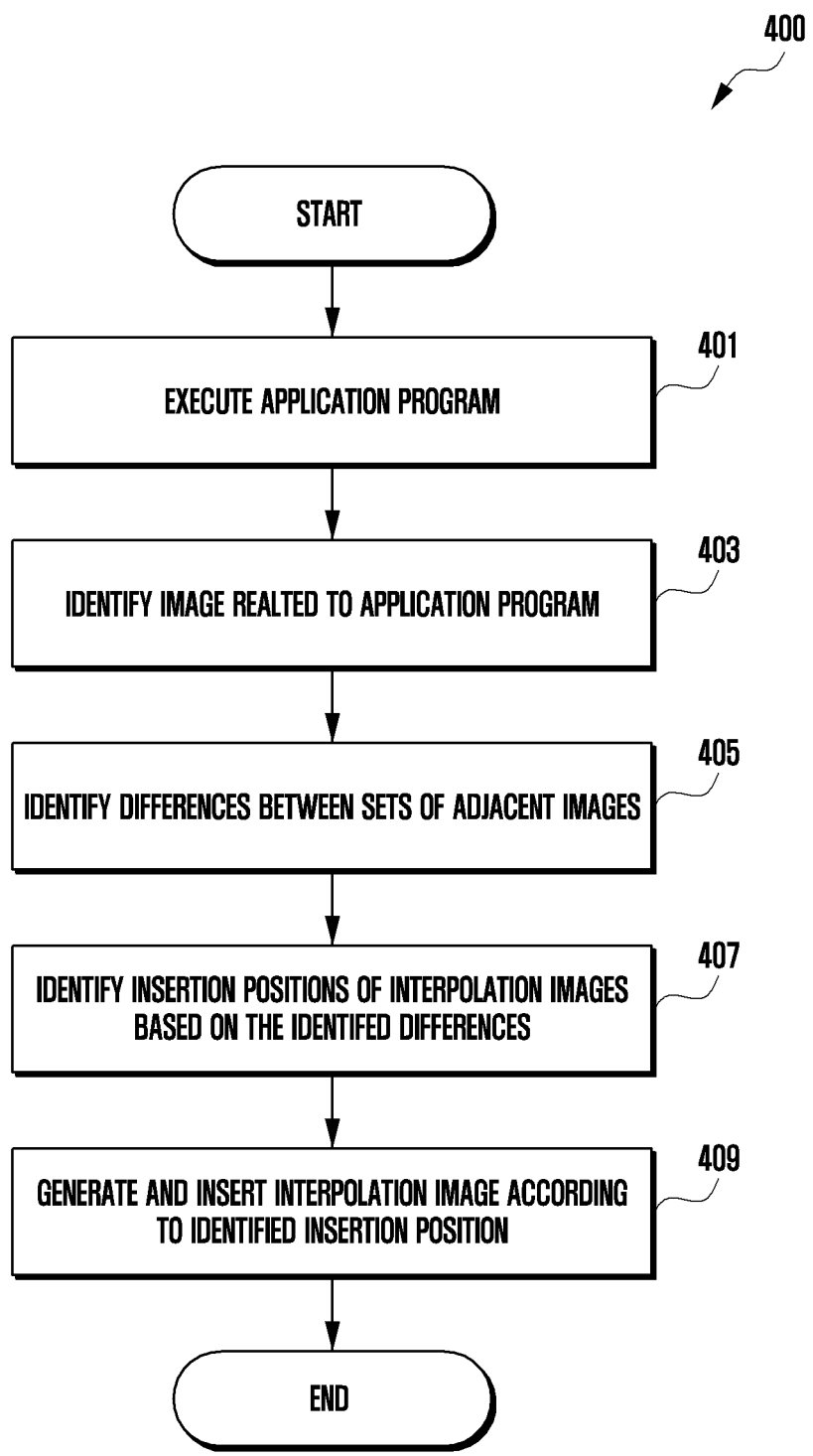
FIG. 4 is a flowchart illustrating insertion of an interpolation image on the basis of differences in images in an electronic device according to certain embodiments.

FIG. 4 is a flowchart illustrating insertion of an interpolation image on the basis of differences in images in an electronic device according to certain embodiments. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1.

Referring to FIG. 4, according to certain embodiments, the electronic device (e.g., the processor 120 of FIG. 1, the control module 200 or the application execution module 210 of FIG. 2), in operation 401, may execute at least one application program related to the electronic device (e.g., the electronic device 101). According to an embodiment, the processor 120 (or the control module 200) may execute an application program associated with an icon corresponding to a selection input when the selection input (or a user input) for any one of at least one icon displayed on the display device 160 is detected. For example, at least one icon displayed on the display device 160 may correspond to at least one application program installed in the electronic device 101.

According to certain embodiments, in operation 403, the electronic device (e.g., the processor 120 or the application execution module 210) may identify a plurality of images (or frames) related to the execution of the application program. According to an embodiment, the processor 120 (or the application execution module 210) may generate a plurality of images (or frames) for output to the display device 160 according to the execution of the application program. For example, the plurality of images (or frames) may be generated based on a time point at which the images are displayed on the display device 160 on the basis of the execution of an application program.

According to certain embodiments, in operation 405, the electronic device (e.g., the processor 120 or the application execution module 210) may identify a difference between two adjacent (or continuous) images among a plurality of images (or frames) related to the execution of the application program. According to an embodiment, the processor 120 (or the control module 200) may divide the (n−1)$^{th}$ image (or frame) and the n$^{th}$ image (or frame) generated in connection with the execution of the application program into multiple regions on the basis of an image segmentation method (e.g., 5×5 method). The processor 120 (or the control module 200) may compare corresponding partitions with each other in the (n−1)$^{th}$ image (or frame) and the n$^{th}$ image (or frame) to identify the difference between the respective partitions. The processor 120 (or the control module 200) may determine the average of the difference between the partition included in the (n−1)$^{th}$ image (or frame) and the n$^{th}$ image (or frame) as the difference between the (n−1)$^{th}$ image (or frame) and the n$^{th}$ image (or frame). As an example, the difference between the images (or frames) is the amount of change of at least one object included in the image (or frame), and may be determined that the difference between the images (or frames) is relatively large as the amount of change of the object is relatively large.

According to certain embodiments, in operation 407, the electronic device (e.g., the processor 120 or the control module 200) may identify insertion positions of interpolation images for each reference range based on the differences between two adjacent (or continuous) images (or frames within each range/set). According to an embodiment, the processor 120 (or the control module 200) may configure the insertion position of the interpolation image on the basis of a difference between adjacent (or continuous) images (or frames) related to the execution of an application program. For example, the insertion position of the interpolation image within the reference range may be configured based on two images (or frames) having the smallest difference between adjacent images (or frames) within the reference range. As an example, the size of the reference range may be configured based on at least one of target graphic performance (e.g., FPS) of the application program or status information of the electronic device 101. According to an embodiment, the processor 120 (or the control module 200) may configure insertion position of an interpolation image on the basis of two images (or frames) in which a difference satisfies a reference difference (e.g., a designated first condition) among a plurality of images (or frames) related to execution of an application program.

According to certain embodiments, in operation 409, the electronic device (e.g., the processor 120, the control module 200, or the interpolation generation module 220) may generate and insert an interpolation image corresponding to the insertion position of the interpolation image on the basis of the difference between the images (or frames). In an embodiment, as illustrated in FIG. 3C, when the difference between a third image (or frame) 320 and a fourth image (or frame) 322 satisfies a reference difference, the processor 120 (or the control module 200) may determine to insert the interpolation image 330 between the third image (or frame) 320 and the fourth image (or frame) 322. In this case, the processor 120 (or the interpolation image generation module 220) may generate the interpolation image 330 through interpolation based on the third image (or frame) 320 and the fourth image (or frame) 322. The processor 120 (or the control module 200) may render by inserting the interpolation image 330 between the third image (or frame) 320 and the fourth image (or frame) 322.

FIG. 5 is a flowchart illustrating configuration of an insertion position of an interpolation image on the basis of a reference range in an electronic device according to certain embodiments. According to an embodiment, the operations of FIG. 5 may be an example of operations 405 and 407 of FIG. 4. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1.

Referring to FIG. 5, according certain embodiments, in operation 501, the electronic device (e.g., the processor 120 of FIG. 1 or the control module 200 of FIG. 2) may identify differences between sets of images (or frames) included in a reference range. According to an embodiment, the processor 120 (or the control module 200) may insert an interpolation image for each reference range configured based on target graphic performance (e.g., FPS) of an application program. For example, when the target graphic performance of a game application supporting 30 FPS is set for 45 FPS, the processor 120 (or the control module 200) may determine to insert one interpolation image at intervals of two images (or frames). Accordingly, the three images (or frames) including 3 existing images may be set as a single reference range. For example, the single reference range may include the third image (or frame) 320, the fourth image (or frame) 322, and the fifth image (or frame) 324 of FIG. 3C. In this case, the processor 120 (or the control module 200) may identify the difference between the third image (or frame) 320 and the fourth image (or frame) 322, and the difference between the fourth image (or frame) 322 and the fifth image (or frame) 324. For example, the next reference range may include the fifth image (or frame) 324, the sixth image (or frame) 326, and the seventh image (or frame) 328 of FIG. 3C. In this case, the processor 120 (or the control module 200) may identify the difference between the fifth image (or frame) 324 and the sixth image (or frame) 326, and the difference between the sixth image (or frame) 326 and the seventh image (or frame) 328.

According to certain embodiments, in operation 503, the electronic device (e.g., the processor 120 or the control module 200) may identify the insertion position of the interpolation image within a reference range, based the images having the lowest difference within the reference range. According to an embodiment, in the case of FIG. 3C, when the difference between a third image (or frame) 320 and a fourth image (or frame) 322 is less than the difference between the fourth image (or frame) 322 and a fifth image (or frame) 324, the processor 120 (or the control module 200) may determine to insert an interpolation image 330 between the third image (or frame) 320 and the fourth image (or frame) 322. In this case, the processor 120 (or the interpolation image generation module 220) may generate an interpolation image 330 via the interpolation method on the basis of the third image (or frame) 320 and the fourth image (or frame) 322. According to an embodiment, in the case of FIG. 3C, when the difference between the fifth image (or frame) 324 and a sixth image (or frame) 326 is greater than the difference between the sixth image (or frame) 326 and a seventh image (or frame) 328, the processor 120 (or the control module 200) may determine to insert an interpolation image 342 between the sixth image (or frame) 326 and a seventh image (or frame) 328. In this case, the processor 120 (or the interpolation image generation module 220) may generate an interpolation image 342 via the interpolation method on the basis of the sixth image (or frame) 326 and the seventh image (or frame) 328.

FIG. 6 is a flowchart illustrating configuration of an insertion position of an interpolation image on the basis of differences in images in an electronic device according to certain embodiments. According to an embodiment, the operations of FIG. 6 may be an example of operation 405 and operation 407 of FIG. 4. In the following embodiments, each operation may be performed sequentially, but is not necessarily performed sequentially. For example, the order of each operation may be changes, and at least two operations may be performed in parallel. As an example, the electronic device may be the electronic device 101 of FIG. 1. Hereinafter, at least some operations of FIG. 6 will be described with reference to FIGS. 7A and 7B. FIG. 7A illustrates a configuration of an image segmentation method according to certain embodiments, and FIG. 7B illustrates a configuration of an image segmentation method according to certain embodiments.

Referring to FIG. 6, according to certain embodiments, in operation 601, the electronic device (e.g., the processor 120 of FIG. 1 or the control module 200 of FIG. 2) may identify the difference between the $(n-1)^{th}$ image (or frame) and the $n^{th}$ image (or frame) among a plurality of images (or frames) related to an application program executed in the electronic device (e.g., the electronic device 101). According to an embodiment, the processor 120 (or the control module 200) may divide the $(n-1)^{th}$ image (or frame) 700 and the $n^{th}$ image (or frame) 702 into a plurality of regions (e.g., 9) on the basis of the first image segmentation method (e.g., 3×3 segmentation method), as shown in FIG. 7A. The processor 120 (or the control module 200) may identify the difference between the divided regions corresponding to each other in the (n−1)$^{th}$ image (or frame) 700 and the n$^{th}$ image (or frame) 702. The processor 120 (or the control module 200) may determine the average of the differences between the respective partitions as the difference between the (n−1)$^{th}$ image (or frame) 700 and the n$^{th}$ image (or frame) 702. As an example, n is identification information of an image (or frame) related to the execution of an application program and may be configured based on a time point when the corresponding image (or frame) is displayed on the display device 160.

According to certain embodiments, in operation 603, the electronic device (e.g., the processor 120 or the control module 200) may identify whether the difference of images is equal to or less than a reference difference (e.g., a designated first condition). As an example, the reference difference may be predefined as a reference for determining whether to insert an interpolation image or may include a designated first condition configured (or updated) based on graphic configuration information of the application program or graphic configuration information of the display device 160 or user input. As an example, the processor 120 (or the control module 200) may determine that the designated first condition is satisfied, when the difference between the images exceeds the reference difference.

According to certain embodiments, in operation 607, when the difference of the images exceeds the reference difference (e.g., "No" of operation 603), the electronic device (e.g., the processor 120 or the control module 200) may update the count of instances in which an interpolation is not generated. According to an embodiment, when the difference between the (n−1)$^{th}$ image (or frame) 700 and the n$^{th}$ image (or frame) 702 of FIG. 7A exceeds the reference difference, the processor 120 (or the control module 200) may determine not to insert an interpolation image between the (n−1)$^{th}$ image (or frame) 700 and the n$^{th}$ image (or frame) 702. In this case, the non-generation count related to the interpolation image may be increased. For example, the non-generation count related to the interpolation image may include the number of times it is determined that the interpolation image is not continuously inserted.

According to certain embodiments, the electronic device (e.g., the processor 120 or the control module 200) may identify whether the non-generation count exceeds the reference number (e.g., the specified second condition) in operation 609. As an example, the reference number of times may include a designated second condition for determining when to change the image segmentation method. As an example, the processor 120 (or the control module 200) may determine that the designated second condition is satisfied when the non-generation count related to the interpolation image exceeds the reference number.

According to certain embodiments, in operation 611, when the non-generation count related to the interpolation image exceeds the reference number (e.g., "Yes" of operation 609), the electronic device (e.g., the processor 120 or the control module 200) may update the image segmentation method used to identify differences in images (or frames). According to an embodiment, the processor 120 (e.g., the control module 200) may change the image segmentation method so that images can be compared relatively closely when the non-generation count related to the interpolated image exceeds the reference number. For example, the processor 120 (or the control module 200) may change the image segmentation method to the second image segmentation method (e.g., 5×5 division method) of FIG. 7B, which can compare images relatively more closely than the first image segmentation method (e.g., 3×3 segmentation method) of FIG. 7A.

According to certain embodiments, when the non-generation count related to the interpolated image equal to or less than the reference number (e.g., "No" of operation 609) or the image segmentation method is updated (e.g., operation 611), in operation 613, the electronic device (e.g., the processor 120 or the control module 200) may update n, which is identification information of an image (or frame). For example, the image identification n may be updated to identify the difference between the next images (or frames) in operation 601 (e.g., n++).

According to certain embodiments, when the difference of images is equal to or less than a reference difference (e.g., "Yes" of operation 603), in operation 605, the electronic device (e.g., the processor 120 or the control module 200) may configure or set the insertion position of an interpolation image on the basis of the (n−1)$^{th}$ image (or frame) and the n$^{th}$ image (or frame). According to an embodiment, when the difference between the (n−1)$^{th}$ image (or frame) 710 and the n$^{th}$ image (or frame) 712 of FIG. 7B is equal to or less than the reference difference, the processor 120 (or the control module 200) may determine to insert an interpolation image between the (n−1)$^{th}$ image (or frame) 710 and the n$^{th}$ image (or frame) 712. As an example, the insertion position of the interpolation image may be configured between the (n−1)$^{th}$ image (or frame) 710 and the n$^{th}$ image (or frame) 712.

According to certain embodiments, the electronic device (e.g., the processor 120 of FIG. 1 or the control module 200 of FIG. 2) may configure the insertion position of an interpolation image on the basis of the machine learning (e.g., the Q-learning) on the basis of the difference of images. According to an embodiment, the processor 120 (or the control module 200) may determine that the difference between the corresponding images does not satisfy the reference difference when the reward related to frame interpolation is less than or equal to the reference value on the basis of the result of Q-learning based on the difference between the images. Accordingly, the processor 120 (or the control module 200) may determine that an interpolation image is not inserted between the corresponding images. According to an embodiment, when a reward related to frame interpolation exceeds a reference value on the basis of a result of Q-learning based on a difference between images, the processor 120 (or the control module 200) may determine that the difference between the corresponding images satisfies the reference difference. Accordingly, the processor 120 (or the control module 200) may determine to insert an interpolation image between the corresponding images.

According to certain embodiments, the electronic device (e.g., the processor 120 of FIG. 1 or the control module 200 of FIG. 2) may configure the insertion position of the interpolation image on the basis of the number of divided regions that do not satisfy the reference difference. According to an embodiment, the processor 120 (or the control module 200) may identify the difference the corresponding divided regions in the (n−1)$^{th}$ image (or frame) 700 and the n$^{th}$ image (or frame) 702, divided based on the first image segmentation method (e.g., 3×3 segmentation method), as shown in FIG. 7A. The processor 120 (or the control module 200) may identify the number of the divided regions having a difference exceeding a reference difference among the divided regions. For example, when the number of divided regions exceeding the reference difference exceeds the reference number, the processor 120 (or the control module 200) may determine not to insert an interpolation image between the (n−1)$^{th}$ image (or frame) 700 and the n$^{th}$ image (or frame) 702. For example, when the number of divided regions exceeding the reference difference is less than or equal to the reference number, the processor 120 (or the control module 200) may determine to insert an interpolation image between the (n−1)$^{th}$ image (or frame) 700 and the n$^{th}$ image (or frame) 702.

Figure 8:
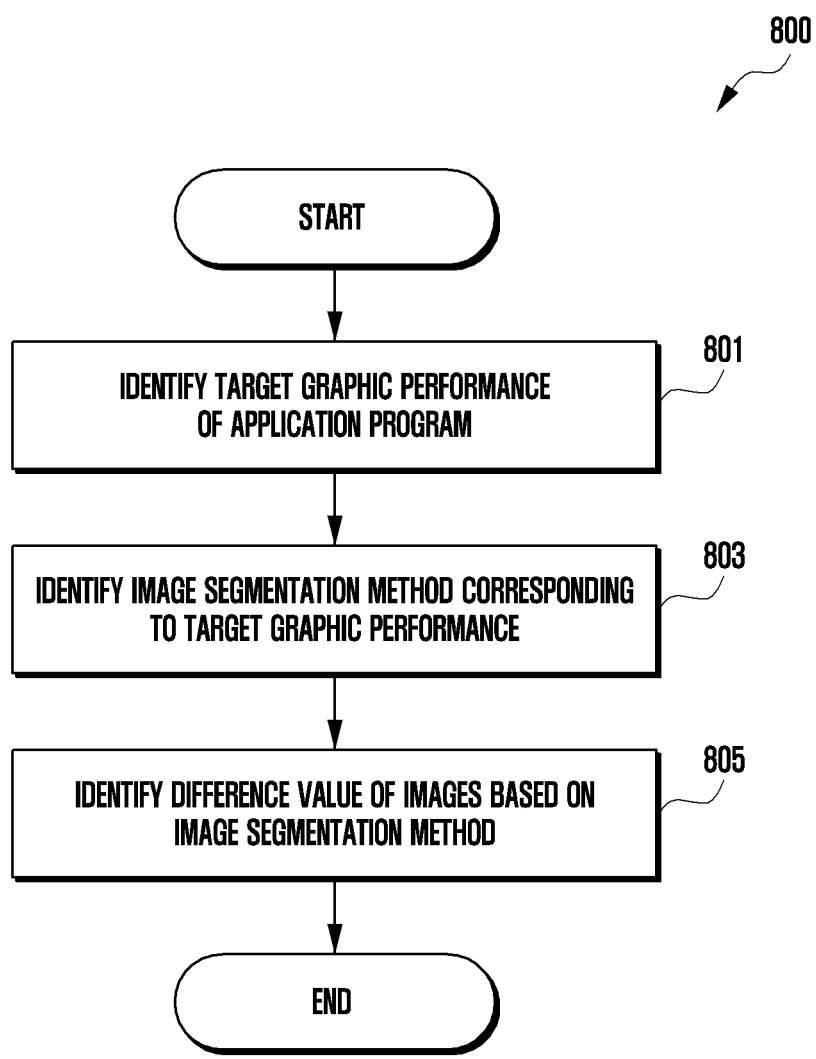
FIG. 8 is a flowchart illustrating identification of differences in images in an electronic device according to certain embodiments.

FIG. 8 is a flowchart illustrating identification of differences in images in an electronic device according to certain embodiments. According to an embodiment, the operations of FIG. 8 may be examples of the operation 405 of FIG. 4. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1.

Referring to FIG. 8, according to certain embodiments, when identifying multiple images (or frames) related to the execution of an application program (e.g., operation 403 of FIG. 4), in operation 801, the electronic device (e.g., the processor 120 of FIG. 1 or the control module 200 of FIG. 2) may identify a target graphic performance (e.g., FPS) of the application program. For example, the target graphic performance may be configured based on a graphic performance supported by the display device 160 or a result of user input or machine learning (e.g., Q-learning).

According to certain embodiments, in operation 803, the electronic device (e.g., the processor 120 or the control module 200) may identify the image segmentation method corresponding to the target graphic performance (e.g., FPS) of the application program. Selection of the image segmentation method may be facilitated by a table association methods, granularities, etc. with a present FPS performance and target FPS performances, etc. For example, a processor may identify that an increase from 30 FPS to 45 FPS requires an image segmentation of 20×20. According to an embodiment, executing of frame interpolation may result in a severe afterimage effect when the graphic performance of the application program is below a certain threshold. Accordingly, the processor 120 (or the control module 200) may select (e.g., by the table) an image segmentation method (e.g., 20×20 segmentation) having a sufficient granularity to compare images in a detail level sufficient for target graphic performance (e.g., 30 FPS or less) of an application program to avoid negative image effects such as a distracting afterimage effect.

According to certain embodiments, in operation 805, the electronic device (e.g., the processor 120 or the control module 200) may identify the difference of images (or frames) on the basis of the image segmentation method corresponding to the target graphic performance (e.g., FPS) of the application program. According to an embodiment, the processor 120 (or the control module 200) may identify the difference between the divided regions corresponding to each other of the divided images (or frames) on the basis of the image segmentation method corresponding to the target graphic performance (e.g., FPS) of the application program. The processor 120 (or the control module 200) may determine the average of the differences of the divided regions as the difference of the images. For example, the average of the differences of the divided regions may include an average value of the differences of all the divided regions included in the image (or frame). For another example, the average of the differences of the divided regions may include an average value of at least one divided region having a relatively large difference among the divided regions included in the image (or frame).

Figure 9:
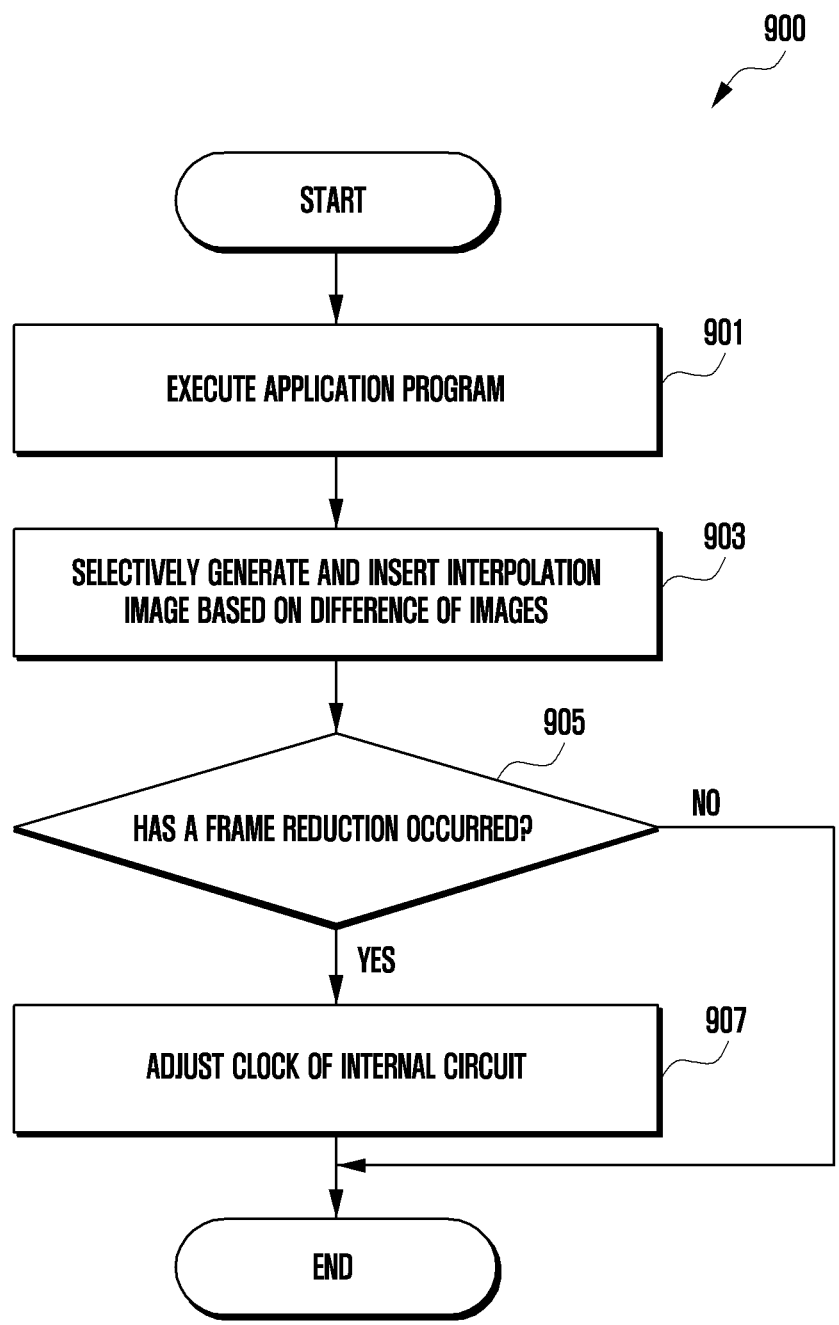
FIG. 9 is a flowchart illustrating control of a clock of an internal circuit in an electronic device according to certain embodiments.

FIG. 9 is a flowchart illustrating control of a clock of an internal circuit in an electronic device according to certain embodiments. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1.

Referring to FIG. 9, according to certain embodiments, in operation 901, the electronic device (e.g., the processor 120 of FIG. 1, the control module 200 or the application execution module 210 of FIG. 2) may execute at least one application program among a plurality of application programs installed in the electronic device (e.g., the electronic device 101). According to an embodiment, the processor 120 (or the application execution module 210) may execute at least one application program corresponding to a selection input detected through the input device 150 among the plurality of application programs installed in the electronic device 101.

According to certain embodiments, in operation 903, the electronic device (e.g., the processor 120 or the control module 200) may selectively generate and insert an interpolation image on the basis of the difference between adjacent images (or frames) among the plurality of images (or frames) related to the application program. According to an embodiment, when the difference between images among the plurality of images related to the application program satisfies a reference difference, the processor 120 (or the control module 200) may configure an insertion position of an interpolation image on the basis of the images, as operation 601 to operation 613 of FIG. 6. The processor 120 (or the control module 200) may generate and insert an interpolation image corresponding to the insertion position of the interpolation image.

According to certain embodiments, in operation 905, the electronic device (e.g., the processor 120 or the control module 200) may identify whether a frame drop is detected (or predicted to occur). According to an embodiment, the processor 120 (or the control module 200) may selectively generate and insert an interpolation image on the basis of a difference between images (or frames), thereby identifying whether it is predicted that the target graphic performance of the application program (e.g., FPS) cannot be satisfied. The processor 120 (or the control module 200) may determine that frame reduction will occur when it is predicted that the target graphic performance of the application program (e.g., FPS) cannot be satisfied.

According to certain embodiments, the electronic device (e.g., the processor 120 or the control module 200) may maintain the execution of the application program when the occurrence of frame reduction is not detected and is not predicted (e.g., "No" in operation 905). According to an embodiment, the processor 120 (or the control module 200) may selectively generate and insert an interpolation image on the basis of a difference between images (or frames) related to the execution of the application program when the application program is running.

According to certain embodiments, when occurrence of frame reduction is detected or predicted (e.g., "Yes" of operation 905), in operation 907, the electronic device (e.g., the processor 120 or the control module 200) may control the clock of an internal circuit on the basis of the frame reduction. According to an embodiment, when the frame reduction occurs, the processor 120 (or the control module 200) may increase the clock of a CPU or GPU related to the execution of the application program.

According to certain embodiments, when occurrence of frame reduction is detected or predicted, the electronic device (e.g., the processor 120 of FIG. 1 or the control module 200 of FIG. 2) may determine a method for responding to frame reduction on the basis of a result of machine learning (e.g., Q-learning) based on differences in images. According to an embodiment, the frame reduction may be caused by selectively generating and inserting the interpolation images based on differences in images. Accordingly, the processor 120 (or the control module 200) may perform machine learning by configuring the weight of the CPU clock control scheme and/or the GPU clock control scheme relatively higher than the frame interpolation scheme among the operations for responding to the frame reduction. In one example, the processor 120 (or the control module 200) may increase the CPU clock in response to the frame reduction when the reward of the CPU's clock control scheme is relatively high on the basis of a result of machine learning based on differences in images. For example, the processor 120 (or the control module 200) may generate and insert an interpolation image when the compensation of the frame interpolation method is relatively high on the basis of the machine learning result based on the difference of the images. In this case, the insertion position of the interpolated image may be configured based on the target graphics performance of the application program regardless of differences in images, or may be configure on the basis of the differences in images.

Figure 10:
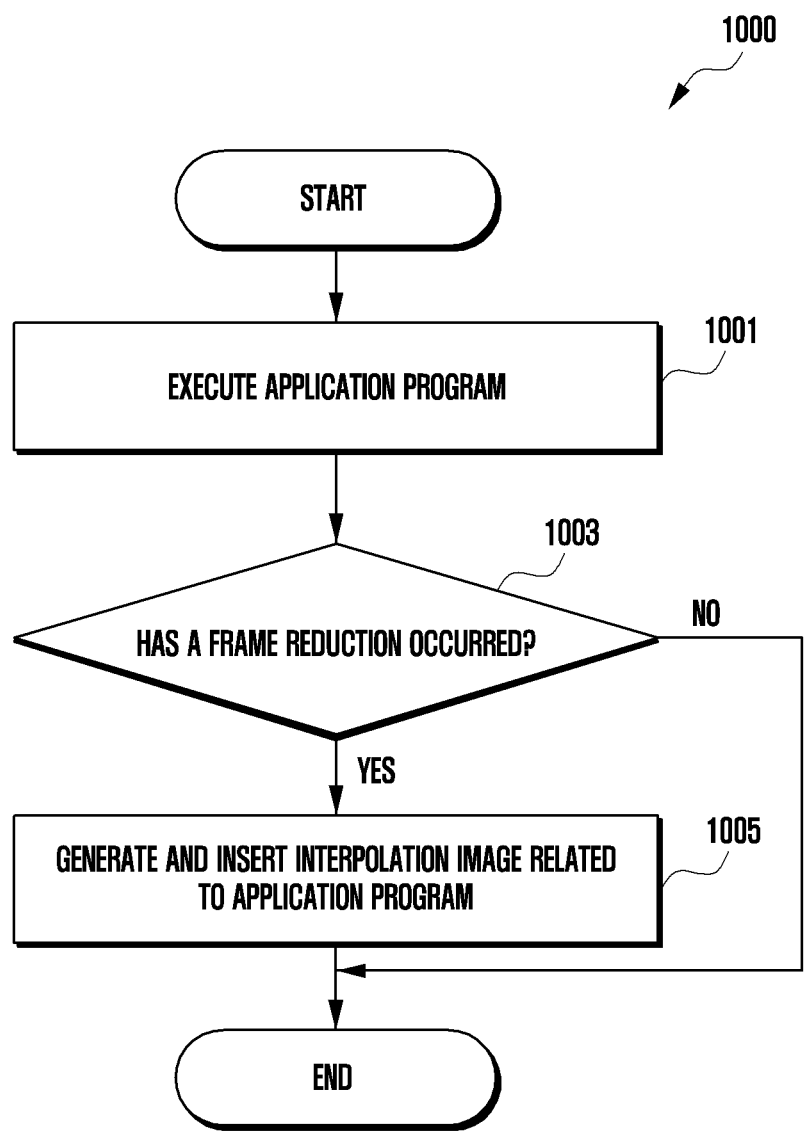
FIG. 10 is a flowchart illustrating insertion of an interpolation image on the basis of frame reduction in an electronic device according to certain embodiments.
Figure 11:
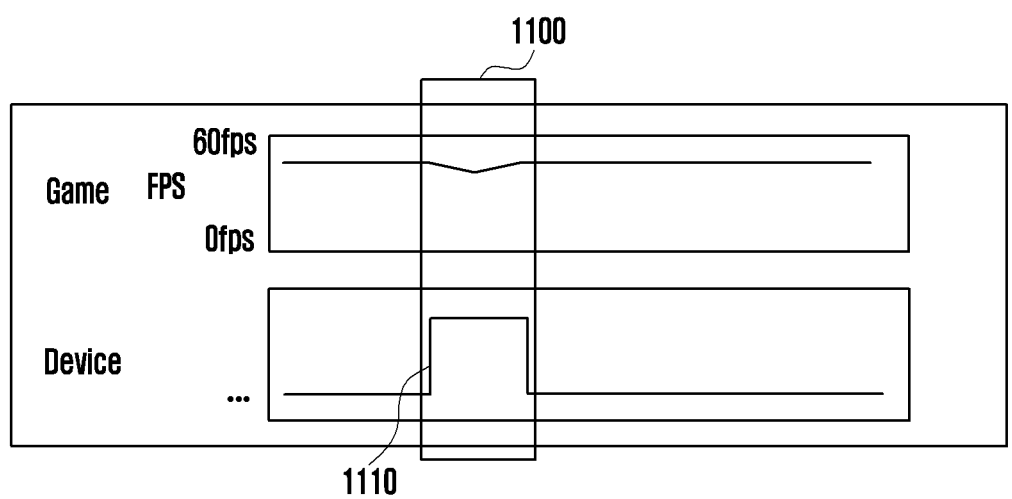
FIG. 11 is a performance change graph according to insertion of an interpolation image according to certain embodiments.

FIG. 10 is a flowchart illustrating insertion of an interpolation image on the basis of frame reduction in an electronic device according to certain embodiments. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1. Hereinafter, at least some operations of FIG. 10 will be described with reference to FIG. 11. FIG. 11 is a performance change graph according to the insertion of an interpolation image according to certain embodiments.

Referring to FIG. 10, according to certain embodiments, in operation 1001, the electronic device (e.g., the processor 120 of FIG. 1, the control module 200 or the application execution module 210 of FIG. 2) may execute at least one application program among a plurality of application programs installed in the electronic device (e.g., the electronic device 101). According to an embodiment, the display device 160 may display a plurality of icons related to a plurality of application programs installed in the electronic device 101. The processor 120 (or the control module 200) may execute an application program related to an icon in which a selection input (or user input) among the plurality of icons displayed on the display device 160 is detected. The processor 120 (or the control module 200) may render a plurality of images (or frames) related to execution of the application program generated by the application execution module 210. The display device 160 may output a plurality of images (or frames) rendered by the processor 120 (or the control module 200).

According to certain embodiments, in operation 1003, the electronic device (e.g., the processor 120 or the control module 200) may identify whether the frame reduction is detected (or predicted). According to an embodiment, when the image (or frame) related to the execution of the application program is not identified at a predetermined time related to the execution of the application program, the processor 120 (or the control module 200) may determine that frame reduction has occurred. According to an embodiment, the processor 120 (or the control module 200) may predict the occurrence of frame reduction on the basis of a result of machine learning based on differences in images.

According to certain embodiments, when the occurrence of frame reduction is not detected or not predicted (e.g., "No" in operation 1003), the electronic device (e.g., the processor 120 or the control module 200) may maintain the execution of at least one application program. According to an embodiment, the processor 120 (or the control module 200) may control the display device 160 to display a plurality of images (or frames) related to the execution of the application program generated by the application execution module 210.

According to certain embodiments, when the occurrence of frame reduction is detected or predicted (e.g., "Yes" in operation 1003), in operation 1005, the electronic device (e.g., the processor 120 or the control module 200) may generate and insert at least one interpolation image associated with the application program. According to an embodiment, when the occurrence of frame reduction is detected or predicted (1100) as in FIG. 11, the processor 120 (or the control module 200) may selectively generate and insert an interpolation image on the basis of a difference between adjacent images (or frames) among a plurality of images (or frames) related to the execution of an application program (1110). For example, the processor 120 (or the control module 200) may configure a position between images (or frames) having the lowest difference for each reference range as an insertion position of an interpolation image, as in operation 501 to operation 503 of FIG. 5. For another example, the processor 120 (or the control module 200) may configure the position between images (or frames) in which the difference in images satisfies a reference difference as the insertion position of the interpolation image, as in operation 601 to operation 613 of FIG. 6.

According to certain embodiments, when the occurrence of frame reduction is detected or predicted, the electronic device (e.g., the processor 120 or the control module 200) may render by inserting at least one interpolation image in at least a part of a plurality of images (or frames) related to the execution of an application program. Accordingly, the electronic device (e.g., the processor 120 or the control module 200) may reduce frame reduction.

Figure 12:
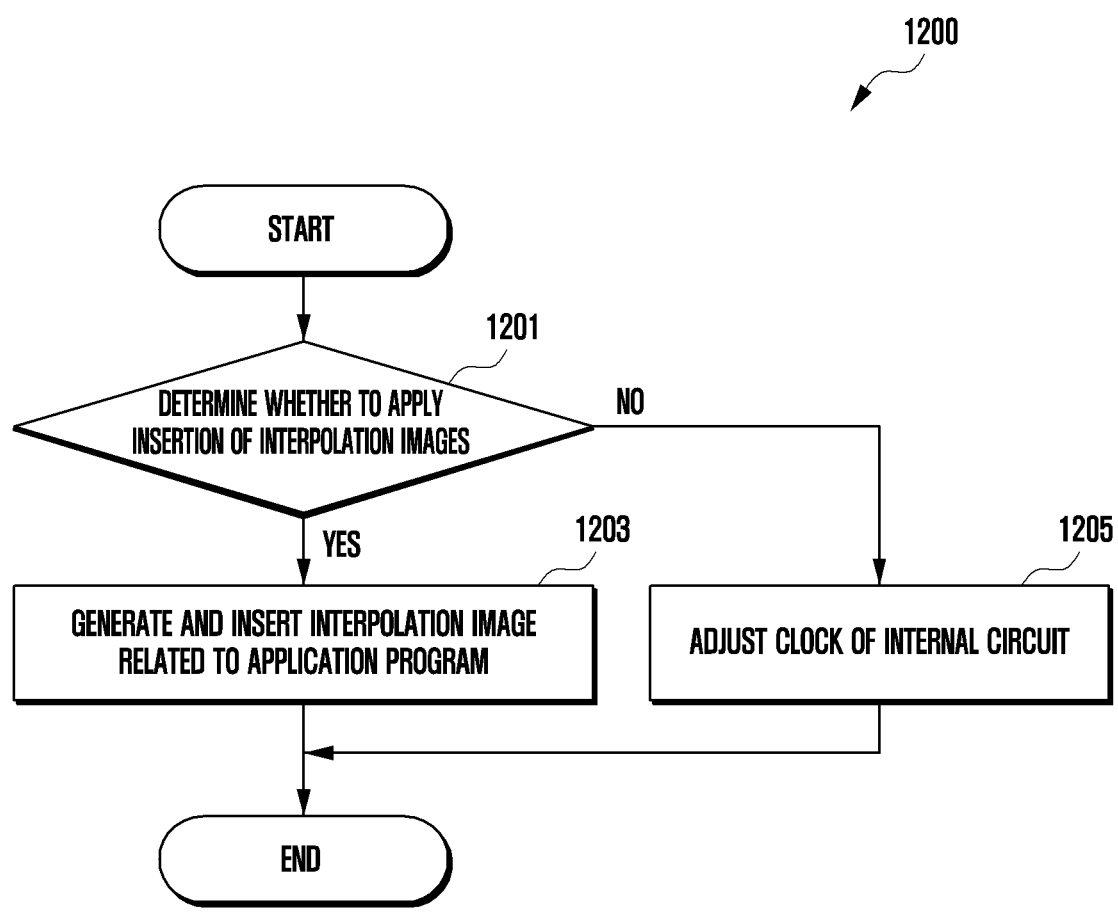
FIG. 12 is a flowchart illustrating selective insertion of an interpolation image based on frame reduction in an electronic device according to certain embodiments.
Figure 13:
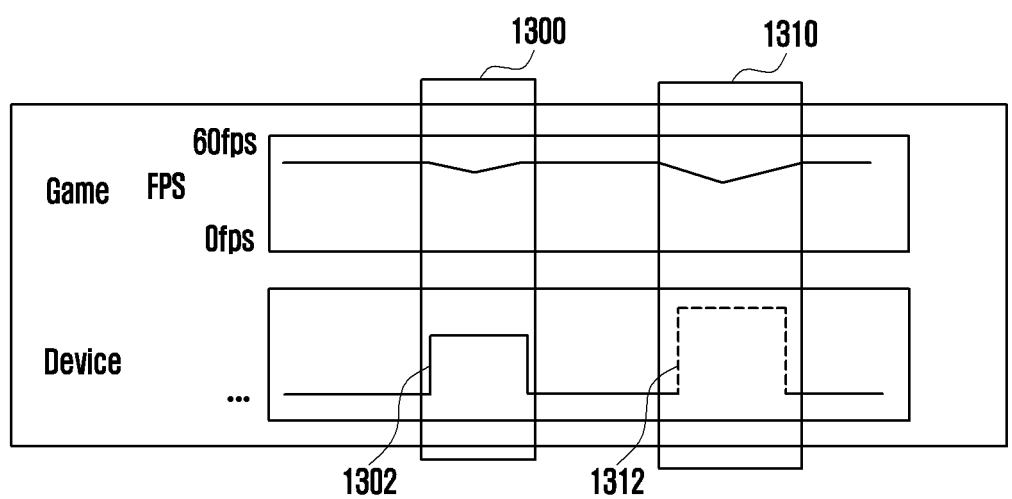
FIG. 13 is a graph of a performance change according to selectively inserting an interpolation image according to certain embodiments.

FIG. 12 is a flowchart illustrating selective insertion of an interpolation image based on frame reduction in an electronic device according to certain embodiments. According to an embodiment, the operations of FIG. 12 may be examples of operation 1005 of FIG. 10. In the following embodiments, each operation may be performed sequentially, but is not necessarily performed sequentially. For example, the order of each operation may be changed, and at least two operations may be performed in parallel. As an example, the electronic device may be the electronic device 101 of FIG. 1. Hereinafter, at least some operations of FIG. 12 will be described with reference to FIG. 13. FIG. 13 is a graph of a performance change according to selectively inserting an interpolation image according to certain embodiments.

Referring to FIG. 12, according to certain embodiments, when the occurrence of frame reduction is detected or predicted (e.g., "Yes" of operation 1003 of FIG. 10), in operation 1201, the electronic device (e.g., the processor 120 or the control module 200 of FIG. 1) may determine whether to apply interpolation image insertion. According to an embodiment, the processor 120 (or the control module 200) may identify whether a frame interpolation method is recommended (or selected) as an optimal response method in response to a frame reduction on the basis of a Q-learning result performed through the machine learning module 230. For example, Q-learning uses the Q function as shown in Equation 1 below to determine the CPU clock, GPU clock, CPU load, GPU load, graphic performance (e.g., FPS), stability related to application program execution, or learning based on at least one of differences in images.

[Equation 1]

$$Q_{t+1}(s_t, a_t) = \underbrace{Q_t(s_t, a_t)}_{\text{old value}} + \underbrace{a_t(s_t, a_t)}_{\text{learning rate}} \cdot \left( \overbrace{\underbrace{R_{t+1}}_{\text{reward}} + \underbrace{\gamma}_{\text{discount factor}} \underbrace{\max_a Q_t(s_{t+1}, a)}_{\text{estimate of optimal before value}}}^{\text{learned value}} - \underbrace{Q_t(s_t, a_t)}_{\text{old value}} \right)$$

For example, in [Equation 1], $Q_{t+1\,(st,\,at)}$ denotes learning information at the present time, $Q_{t\,(st,\,at)}$ denotes learning information at the previous time, and s denotes the state of the electronic device 101 related to the execution of the application program, a denotes an action performed in the state of the electronic device 101 related to execution of the application program, and R denotes a reward of each method. For example, the processor 120 (or the control module 200) may select a response method to be performed in response to the frame reduction on the basis of the compensation of each method corresponding to the state of the frame reduction on the basis of the Q-learning result performed through the machine learning module 230. For example, when the compensation of the CPU clock control method is predicted with a probability of 0.2, the compensation of the GPU clock control method is predicted with a probability of 0.1, and the compensation of the frame interpolation method is predicted with a probability of 0.7 on the basis of the results of machine learning, the processor 120 (or the control module 200) may determine that the frame interpolation method of inserting an interpolation image can produce the best results for frame reduction. According to an embodiment, the processor 120 (or the control module 200) may derive the best result for frame reduction through Q-learning additionally applying pattern information of a previously used corresponding method. For example, when detecting a method for responding to frame reduction, the processor 120 (or the control module 200) may identify pattern information corresponding to the current state. When the CPU's clock control method is used to cope with frame reduction based on the pattern information corresponding to the current state, the processor 120 (or the control module 200) may identify compensation in case of using each control method and compensation in case of using the clock control method of the CPU together. For example, when the compensation of the CPU clock control method is predicted with a probability of 0.2, the compensation of the frame interpolation method is predicted with a probability of 0.7, and the compensation of a case that the clock control method and the frame interpolation method are applied together is predicted with a probability of 0.9 on the basis of the results of machine learning, the processor 120 (or the control module 200) may determine that the method of applying the frame interpolation method and the CPU clock control method together can produce the best results for frame reduction.

According to certain embodiments, when it is determined that the interpolation image insertion is applied (e.g., "Yes" in operation 1201), in operation 1203, the electronic device (e.g., the processor 120 or the control module 200) may selectively generate and insert an interpolation image on the basis of differences in images (or frames) related to the execution of the application program. For example, when the occurrence of frame reduction is detected or predicted, as in FIG. 13, the processor 120 (or the control module 200) may select a response method for responding to the state of frame reduction on the basis of the result of machine learning (e.g., Q-learning) (1300). When the frame interpolation method is selected based on the machine learning result, as in FIG. 13, the processor 120 (or the control module 200) may prevent frame reduction by selectively inserting (1302) an interpolation image between images (or frames) related to the execution of an application program. For example, the insertion position of the interpolation image may be configured based on images (or frames) having the lowest difference for each reference range, as operation 501 to operation 503 of FIG. 5. For another example, the insertion position of the interpolation image may be configured based on images (or frames) in which the difference between the images (or frames) satisfies a reference difference, as operation 601 to operation 613 of FIG. 6.

According to certain embodiments, when the interpolation image insertion is not applied (e.g., "No" in operation 1201), in operation 1205, the electronic device (e.g., the processor 120 or the control module 200) may adjust the clock of the internal circuit (e.g., CPU or GPU). According to an embodiment, when the occurrence of frame reduction is detected or predicted (1310), as in FIG. 13, the processor 120 (or the control module 200) may select a clock control method of a CPU as a method for responding to a state of frame reduction on the basis of a result of machine learning (e.g., Q-learning). In this case, the processor 120 (or the control module 200) can prevent the frame reduction by increasing the CPU clock (1312), as in FIG. 13.

According to certain embodiments, when the occurrence of frame reduction is detected or predicted, the electronic device (e.g., the processor 120 or the control module 200) may select a plurality of response methods on the basis of the result of machine learning. According to an embodiment, the processor 120 (or the control module 200) may select at least two response methods among a CPU clock control method, a GPU clock control method, or a frame interpolation method on the basis of the result of machine learning (e.g., Q learning).

According to certain embodiments, an operation method of an electronic device (e.g., the electronic device 101 of FIG. 1) may include executing an application program, identifying an insertion position of an interpolation image on the basis of a plurality of images related to the execution of the application program, if a frame drop is detected, generating an interpolation image corresponding to the insertion position of the interpolation image, and inserting the interpolation image into at least a portion of the plurality of images on the basis of the insertion position of the interpolation image.

According to certain embodiments, the identifying the insertion position of the interpolation image may include identifying the insertion position of the interpolation image within a reference range on the basis of a difference of the images for each reference range.

According to certain embodiments, the identifying the insertion position of the interpolation image may include configuring the insertion position of the interpolation image on the basis of images having a smallest difference in images within the reference range.

According to certain embodiments, the identifying the insertion position of the interpolation image may include identifying a difference between images having adjacent playback time points among the plurality of images, and identifying the insertion position of the interpolation image on the basis of the difference of the images.

According to certain embodiments, the identifying the difference between the images may include: dividing a first image and a second image having adjacent playback time point among the plurality of image related to the execution of the application program into a first number of regions on the basis of a first segmentation method; identifying a difference between regions corresponding to each other in the first image and the second image; and identifying the difference between the first image and the second image on the basis of the difference between the divided regions.

According to certain embodiments, the identifying the insertion position of the interpolation image may include configuring the insertion position of the interpolation image on the basis of the first image and the second image, if the difference between the first image and the second image satisfies a designated first condition.

According to certain embodiments, the generating the interpolation image may include generating the interpolation image between the first image and the second image via a frame interpolation based on the first image and the second image, if the insertion position of the interpolation is configured based on the first image and the second image.

According to certain embodiments, the operation method may further include identifying a difference between the second image and a third image having adjacent playback time points among the plurality of frames, if the difference between the first image and the second image does not satisfy the designated first condition.

According to certain embodiments, the identifying the difference between the second image and the third image may include: identifying the number of consecutive failures of the designated first condition, if the difference between the first image and the second image does not satisfy the designated first condition; dividing the second image and the third image into a second number of regions on the basis of a second segmentation method different from the first segmentation method, if the number of the consecutive failures of the designated first condition satisfies a designated second condition; and identifying a difference between the second image and a third image on the basis of a difference in the second number of regions.

According to certain embodiments, the identifying the insertion position of the interpolation image may include identifying the insertion position of the interpolation image on the basis of a Q-learning result based on the difference of the images having adjacent playback time points among the plurality of images related to the execution of the application program.

According to certain embodiments, the electronic device selectively generates and inserts an interpolation image on the basis of the difference between the images, thereby reducing the occurrence of an afterimage caused by the frame interpolation method.

According to certain embodiments, when a frame drop occurs, the electronic device can maintain the graphic performance of the electronic device by selectively applying the clock control or frame interpolation method of the internal circuit on the basis of the result of machine learning (e.g., Q-learning) based on the difference of the images (or frames).

The embodiments disclosed in the specification and drawings are merely illustrative of the technical contents according to the embodiments and are merely presented as specific examples to help understanding of the embodiments, and it is not intended limit the embodiments. Therefore, the breadth of certain embodiments should be interpreted to include all changes or modified forms derived based on the technical aspects of certain embodiments in addition to the embodiments disclosed herein to be included in the embodiments.

What is claimed is:

1. An electronic device, comprising:
a display device; and
a processor operatively connected to the display device, wherein the processor is configured to:
execute an application program resulting in a plurality of images;
based on detecting a frame drop, identify a difference between images having adjacent playback time points in the plurality of images;
identify an insertion position of an interpolation image as being between the images, when the difference between images is less than a reference difference;
generate the interpolation image corresponding to the insertion position between images; and
insert the interpolation image into the insertion position between the images.

2. The electronic device of claim 1, wherein the plurality of images is divided into a plurality of references ranges, each reference range indicating a count of images , and
wherein insertion positions of interpolation images are identified within each reference range based on an identified difference of respective images included in each reference range.

3. The electronic device of claim 2, wherein the processor is further configured to: set the insertion positions of the interpolation images based on selection of two adjacent images having a smallest identified difference from among the count of images included within each reference range.

4. The electronic device of claim 1, wherein generation of the interpolation image between the images comprises using frame interpolation based on the images.

5. The electronic device of claim 1, wherein the images comprise a first image and a second image and wherein the processor is further configured to:
identify a difference between the second image and a third image having adjacent playback time points, based on detecting that the identified difference between the first image and the second image exceeds the reference difference.

6. The electronic device of claim 5, wherein the processor is further configured to:
divide the first image and the second image into a first number of regions based on a first segmentation method;
identify a difference between corresponding divided regions in the first image and the second image;
when the difference between corresponding divided regions exceeds the reference difference;
increment a count of consecutive failures ; and
divide the second image and the third image into a second number of regions based on a second segmentation method different from the first segmentation method, when the incremented count of consecutive failures satisfies a condition.

7. The electronic device of claim 1, wherein identifying the insertion position of the interpolation image is further based on a Q-learning result utilizing the identified difference between the images.

8. An operation method of an electronic device, the method comprising:
   executing an application program resulting in a plurality of images;
   based on detecting a frame drop, identifying a difference between images having adjacent playback time points in the plurality of images;
   identifying an insertion position of an interpolation image as being between the images, when the difference between images is less than a reference difference;
   generating an interpolation image corresponding to the insertion position between the images; and
   inserting the interpolation image into the insertion position between the images.

9. The method of claim 8, wherein another insertion position of another interpolation image is selected as disposed between two images within a first reference range that have a smallest difference among all adjacent pairs of images within the first reference range.

10. The method of claim 8, wherein identifying the differences between the images comprises:
    dividing a first image and a second image having adjacent playback time points among the plurality of images into a first number of regions using a first segmentation method;
    identifying differences between corresponding regions among the first image and the second image; and
    identifying the difference between the first image and the second image based on the identified differences between the corresponding regions.

11. The method of claim 8, wherein the interpolation image is generated using a frame interpolation based on the images.

12. The method of claim 8, wherein the images comprise a first image and a second image, the method further comprising:
    identifying a difference between the second image and a third image having adjacent playback time points among the plurality of images, based on detecting that the identified difference between the first image and the second image exceeds the reference difference.

13. The method of claim 12, wherein the identifying the difference between the second image and the third image further comprises:
    dividing the first image and the second image into a first number of regions based on a first segmentation method;
    identifying a difference between the corresponding divided regions in the first image and the second image;
    incrementing a count of consecutive failures when the differences between the corresponding divided regions exceeds the reference difference; and
    dividing the second image and the third image into a second number of regions based on a second segmentation method different from the first segmentation method, when the incremented count of consecutive failures satisfies a condition.

14. The method of claim 8, wherein identifying the insertion position of the interpolation image is further based on a Q-learning result utilizing the identified difference between the images.

15. An electronic device comprising:
    a display device; and
    a processor operatively connected to the display device,
    wherein the processor is configured to:
    execute an application program resulting in a plurality of frames;
    identify a difference between images having adjacent playback time points among a plurality of images related to execution of the application program;
    when the difference between the images is less than a reference difference:
        identify an insertion position of an interpolation image as a time position between the images;
        generate the interpolation image corresponding to the time position between the images; and
        insert the interpolation image into the time position between the images;
    when the difference between the images exceeds the reference difference, refrain from inserting.

* * * * *